US010648509B2

(12) United States Patent
Bradshaw et al.

(10) Patent No.: US 10,648,509 B2
(45) Date of Patent: May 12, 2020

(54) OIL FILTER/LIQUID INDICATOR ASSEMBLY

(71) Applicant: ITT MANUFACTURING ENTERPRISES LLC., Wilmington, DE (US)

(72) Inventors: Simon C. Bradshaw, Seneca Falls, NY (US); Sean A. Kopper, Auburn, NY (US); Susan E. Sullivan, Tyre, NY (US); John C. Salerno, Waterloo, NY (US); Cynthia A. Kohberger, Tyre, NY (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 104 days.

(21) Appl. No.: 15/607,905

(22) Filed: May 30, 2017

(65) Prior Publication Data
US 2018/0347631 A1 Dec. 6, 2018

(51) Int. Cl.
F16C 33/66 (2006.01)
F16C 35/04 (2006.01)
(Continued)

(52) U.S. Cl.
CPC .......... F16C 33/667 (2013.01); B01D 29/232 (2013.01); B01D 35/02 (2013.01);
(Continued)

(58) Field of Classification Search
CPC .. F16C 33/66; F16C 33/6637; F16C 33/6685; F16N 13/20
See application file for complete search history.

(56) References Cited

U.S. PATENT DOCUMENTS 3,418,942 A 12/1968 Partos
4,152,031 A 5/1979 Maguire
(Continued)

FOREIGN PATENT DOCUMENTS

DE 102006033555 A1 1/2008
EP 0232978 A2 8/1987
(Continued)

OTHER PUBLICATIONS

English language Abstract of JP2008-303988.
(Continued)

Primary Examiner — Robert A Hopkins
(74) Attorney, Agent, or Firm — Hertzberg, Turk, & Associates, LLC

(57) ABSTRACT

A bearing housing assembly featuring a bearing housing having a bearing housing wall portion with a bearing assembly chamber for receiving a bearing assembly and a shaft to be rotated, an oil sump for receiving and containing oil for lubricating the bearing assembly when the shaft is rotated, an oil path channel formed as an oil path for receiving dirty oil from the bearing assembly chamber for traveling down the oil path, and a filter assembly wall portion forming a filter assembly cavity coupled fluidically between the oil sump and the oil path channel; and a filter assembly arranged in the filter assembly cavity, to couple to the filter assembly wall portion, receive the dirty oil traveling down the oil path, filter the dirty oil and provide filtered oil to the oil sump, so the filtered oil can be recirculated to lubricate the bearing assembly when the shaft is rotated.

19 Claims, 10 Drawing Sheets

(51) Int. Cl.
   *B01D 36/00* (2006.01)
   *F16N 39/06* (2006.01)
   *B01D 35/02* (2006.01)
   *F16N 7/24* (2006.01)
   *B01D 35/143* (2006.01)
   *B01D 29/23* (2006.01)
   *F16N 7/00* (2006.01)
   *F16C 19/52* (2006.01)
   *F16C 33/10* (2006.01)
   *F16C 19/06* (2006.01)
   *F16C 19/54* (2006.01)
   *F04D 29/046* (2006.01)
   *F04D 29/063* (2006.01)

(52) U.S. Cl.
   CPC ......... *B01D 35/143* (2013.01); *B01D 36/003* (2013.01); *F16C 19/522* (2013.01); *F16C 33/105* (2013.01); *F16C 33/66* (2013.01); *F16C 33/6685* (2013.01); *F16C 35/045* (2013.01); *F16N 7/00* (2013.01); *F16N 7/24* (2013.01); *F16N 39/06* (2013.01); *B01D 2201/26* (2013.01); *B01D 2201/303* (2013.01); *B01D 2201/309* (2013.01); *F04D 29/046* (2013.01); *F04D 29/063* (2013.01); *F16C 19/06* (2013.01); *F16C 19/525* (2013.01); *F16C 19/54* (2013.01)

(56) References Cited

U.S. PATENT DOCUMENTS

| | | |
|---|---|---|
| 4,183,591 A | 1/1980 | Mayer |
| 5,150,769 A * | 9/1992 | Major ............... F16C 19/36 184/31 |
| 5,733,048 A | 3/1998 | El-Ibiary et al. |
| 5,785,390 A | 7/1998 | Gold et al. |
| 6,264,003 B1 | 7/2001 | Dong et al. |
| 6,379,537 B1 | 4/2002 | Brieden et al. |
| 6,776,261 B2 | 8/2004 | Eriksen et al. |
| 6,913,438 B2 | 7/2005 | Rockwood |
| 7,140,468 B2 | 11/2006 | Rake et al. |
| 7,178,987 B2 | 2/2007 | Bridges et al. |
| 7,413,054 B2 | 8/2008 | El-Ibiary |
| 7,442,291 B1 | 10/2008 | Discenzo et al. |
| 7,690,246 B1 | 4/2010 | Discenzo |
| 8,534,424 B2 | 9/2013 | Palazzolo |
| 9,010,494 B2 | 4/2015 | Roddis |
| 2014/0083922 A1 | 3/2014 | Lynchard et al. |
| 2014/0314569 A1 | 10/2014 | Michaud et al. |
| 2016/0200994 A1 | 7/2016 | Jiang |

FOREIGN PATENT DOCUMENTS

| | | |
|---|---|---|
| EP | 0589362 B1 | 3/1994 |
| GB | 969371 A | 9/1964 |
| JP | 5893905 A | 6/1983 |
| JP | 2008303988 A | 12/2008 |
| WO | 2017029257 A1 | 2/2017 |

OTHER PUBLICATIONS

English language Abstract of JP58093905.

English language Abstract of DE10 2006 033 555.

Khonsari, M.M., "Effect of Contamination on the Performance of Hydrodynamic Bearings," Proceedings of the Institution of Mechanical Engineers, Part J: Journal of Engineering Tribology, Aug. 2006, 220(5):419-428. http://citeseerx.ist.psu.edu/viewdoc/download?doi=10.1.1.903.1255&rep=rep1&type=pdf.

Loewenthal, S.H., et al, "Filtration Effects on Ball Bearing Life and Condition in a Contaminated Lubricant," Journal of Lubrication Technology (Apr. 1, 1979) 101(2):171-176. https://ntrs.nasa.gov/archive/nasa/casi.ntrs.nasa.gov/19780018503.pdf.

Fitch, J. C., and Simeon Jaggernauth, "Moisture—The Second Most Destructive Lubricant Contaminate, and its Effects on Bearing Life," P/PM Technology 12 printed out on Apr. 4, 2017 (4 pages) http://www.jcb-conseils.com/uploads/1256109595_noria_moisture.pdf.

* cited by examiner

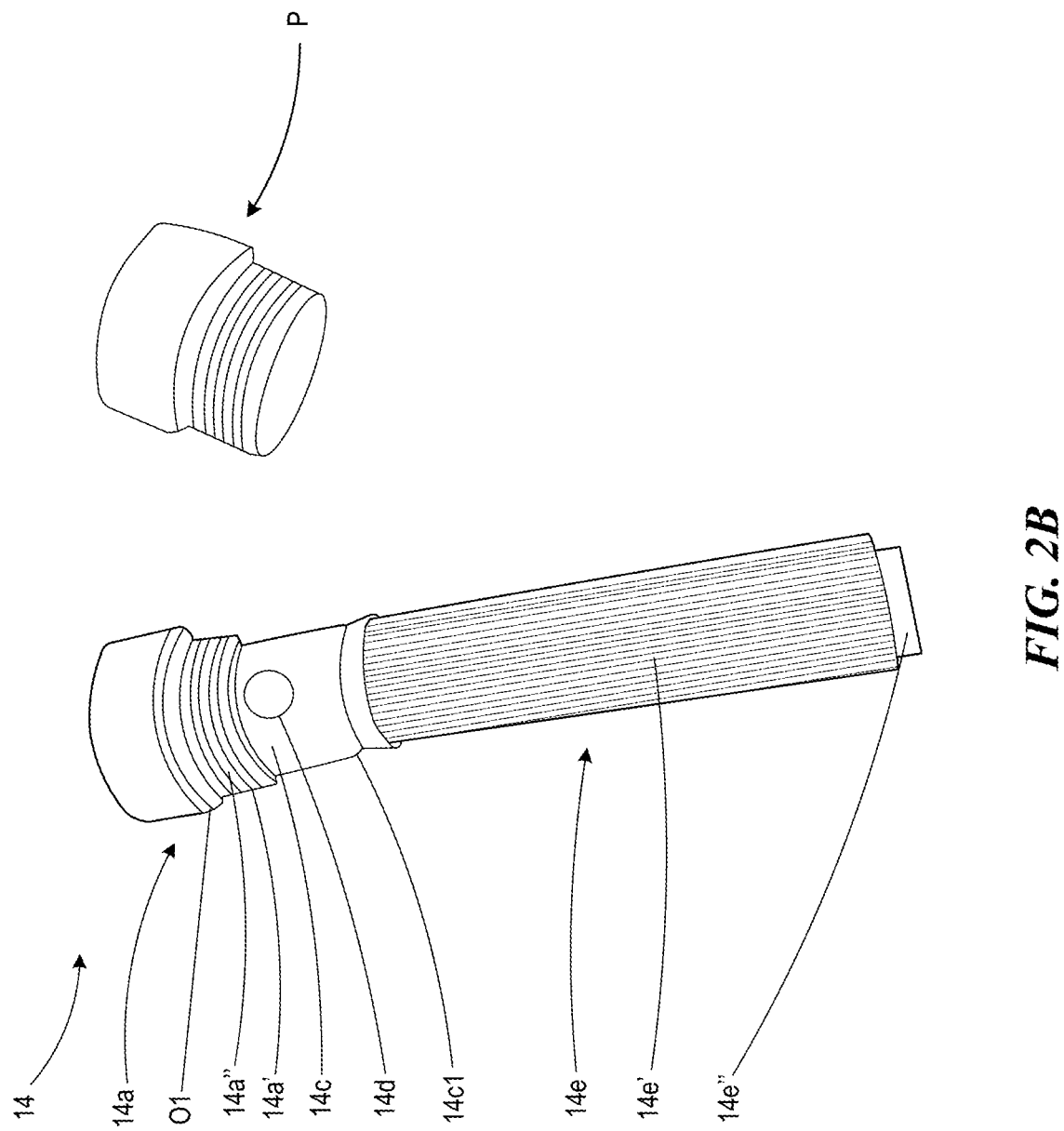

OIL FILTER/LIQUID INDICATOR ASSEMBLY

BACKGROUND OF THE INVENTION

1. Field of the Invention

This application relates to a technique for filtering oil in a bearing housing.

2. Brief Description of Related Art

In the prior art, pump assemblies are known that include a bearing housing having a bearing assembly with a shaft rotated by a motor for turning an impeller of a pump. It is known in the art that bearing housings can harbor contaminants that can cause premature bearing failure. The contaminants can be trapped in the bearing housing and circulate through the bearings. The contaminants may include dirt resulting from bearing wear over time, as well as water that may seep into the bearing the bearing housing from condensation, etc. There is no existing design to filter debris, remove moisture and indicate water contamination and/or dirty oil in the bearing housing.

In view of this, there is a need in the industry for a better way for filtering oil in a bearing housing.

SUMMARY OF THE INVENTION

In summary, and in contrast to the prior art techniques set forth above, the present invention provides a new and unique filter assembly for adapting in a bearing housing for removing debris and moisture from the bearing housing, as well as indicate when moisture is present for reducing or eliminating premature bearing failure. The new filter assembly allows for planned preventative maintenance versus unforeseen downtime in pumps that are critical to their application. The filter assembly is easily installed and replaced by hand without any tools.

Moreover, oil samples may be sent for assessment of waterbeads and crystals arranged in the filter cavity. Oil permissivity through the filter assembly may also be measured.

SPECIFIC EMBODIMENTS OF THE PRESENT INVENTION

According to some embodiments, the present invention may take the form of apparatus featuring a bearing housing assembly, or a filter assembly and a bearing housing, as follows:

The Bearing Housing Assembly

By way of example, and according to some embodiments, the present invention may take the form of a bearing housing assembly featuring:

a bearing housing having
a bearing housing wall portion with a bearing assembly chamber configured or formed therein for receiving a combination of a bearing assembly and a shaft to be rotated,
an oil sump configured or formed therein for receiving and containing oil for lubricating the bearing assembly when the shaft is rotated,
an oil path channel configured or formed therein as an oil path for receiving dirty oil from the bearing assembly chamber for traveling down the oil path, and
a filter assembly wall portion configured to form a filter assembly cavity that is coupled fluidically between the oil sump and the oil path channel; and
a filter assembly configured to mount in the filter assembly cavity, couple to the filter assembly wall portion, receive the dirty oil traveling down the oil path, filter the dirty oil and provide filtered oil to the oil sump, so the filtered oil can be recirculated to lubricate the bearing assembly when the shaft is rotated.

The bearing housing assembly according to the present invention may also include one or more of the following features:

The filter assembly may include a plug having a filter assembly mounting portion configured to couple to the filter assembly wall portion of the bearing housing.

The filter assembly mounting portion and the filter assembly wall portion may be coupled together using a threaded coupling arrangement, including where the filter assembly mounting portion has threads that couple into corresponding threads of the filter assembly wall portion of the bearing housing.

The plug may include a plug housing configured with a plug groove/hole to receive and guide the dirty oil into the filter assembly, including where the plug groove/hole is configured to pass completely through the plug housing.

The filter assembly may include a filter cartridge coupled to a bottom end of the plug housing and configured to filter the dirty oil and provide filtered oil to the oil sump, including where the filter cartridge includes a pleated filtering material arranged in a cartridge mounting assembly.

The filter assembly may include a filter indicator stem, a filter indicator configured on the filter indicator stem, and an internal retainer ring configured to flex inwardly and outwardly for retaining the filter indicator stem and the filter indicator within the plug housing. The filter indicator combination is configured to pass the dirty oil received in the plug groove/hole and provide the dirty oil to the filter cartridge.

The plug housing may include a lower plug housing inner wall having a lower annular channel configured or formed therein. The filter indicator may include a top portion and a bottom hollow portion, the top portion including, or being formed in part by, indicator paper for indicating the quality of the oil. The filter indicator stem may include a base portion and a stem portion, the base portion being configured with holes, openings, apertures or slots formed therein to pass the dirty oil to the filter assembly. The stem portion may be configured to receive the bottom hollow portion of the filter indicator; and the internal retainer ring may be configured to flex and fit into the lower annular channel and retain the filter indicator combination in the lower plug housing inner wall.

The filter cartridge may be, or take the form of, a replaceable filter cartridge, including where the cartridge mounting assembly has threads that couple to corresponding threads of the bottom end of the plug housing.

The filter cartridge may be configured or formed with a filter cavity; and the filter cartridge may include moisture absorbing beads or crystals that reside in the filter cavity, e.g., for absorbing water and moisture in the oil being filtered.

The filter assembly may include a glass window, an O-ring and a glass retainer configured to flex inwardly and outwardly. The plug housing may include an upper plug housing inner wall having an upper annular portion configured or formed therein to receive the O-ring and the glass retainer by flexing and fitting the glass retainer into the upper annular portion. The glass window may be arranged and sealed between the O-ring, the glass retainer and the upper annular portion.

The bearing housing assembly may include a plurality of filter assemblies, where each filter assembly is configured to mount in a respective filter assembly cavity configured or formed in the bearing housing, couple to a respective filter assembly wall portion formed in the bearing housing, receive respective dirty oil traveling down respective oil path channels formed in the bearing housing, filter the respective dirty oil and provide respective filtered oil to the oil sump, so that the filtered oil can be recirculated to lubricate the bearing assembly when the shaft is rotated.

The bearing housing wall portion may include an oil ring channel or groove configured or formed therein; and the bearing housing assembly may include an oil ring arranged in the oil ring channel or groove configured to fling, provide or guide oil into the oil path channel.

The filter assembly may include an upper O-ring and a lower O-ring for providing an upper and lower seal between the filter assembly and the bearing housing wall portion.

The Filter Assembly

By way of further example, and according to some further embodiments, the present invention may take the form of a filter assembly featuring
  a plug having a plug housing with a filter assembly mounting portion configured to mount to a filter assembly wall portion of a bearing housing for arranging the filter assembly in a filter assembly cavity of the bearing housing, the plug housing configured with a plug/groove formed therein for receiving and guiding dirty oil provided from a bearing assembly chamber having a bearing assembly and a shaft to be rotated, to an oil path channel of the bearing housing for traveling down an oil path;
  a filter indicator combination arranged in the plug housing to receive the dirty oil from in the plug groove/hole and configured with holes formed therein to provide the dirty oil to a bottom end of the plug housing; and
  a filter coupled to the bottom end of the plug housing and configured to receive the dirty oil from the filter indicator combination, filter the dirty oil and provide filtered oil to an oil sump of the bearing housing, so the filtered oil can be recirculated to lubricate the bearing assembly when the shaft is rotated.

The filter assembly according to the present invention may also include one or more of the features set forth herein.

The Bearing Housing

By way of still further example, and according to some still further embodiments, the present invention may take the form of a bearing housing for a bearing housing assembly, featuring
  a bearing housing wall portion configured to form a bearing assembly chamber for receiving a combination of a bearing assembly and a shaft to be rotated;
  an oil sump configured or formed within the bearing housing for receiving and containing oil for lubricating the bearing assembly when the shaft is rotated;
  an oil path channel configured or formed within the bearing housing as an oil path to receive dirty oil from the bearing assembly chamber for traveling down the oil path; and
  a filter assembly wall portion configured to form a filter assembly cavity that is coupled fluidically between the oil sump and the oil path channel and also configured to receive a filter assembly for filtering the dirty oil traveling along the oil path and providing filter oil to the oil sump, so the filtered oil can be recirculated to lubricate the bearing assembly when the shaft is rotated.

The bearing housing according to the present invention may also include one or more of the features set forth herein.

The present invention provides a better way for filtering oil in a bearing housing of a.

BRIEF DESCRIPTION OF THE DRAWING

The drawing, not necessarily drawn to scale, includes the following Figures:

FIG. 2B is a photograph of a filter assembly and a plug P for using when the filter assembly is not being used, according to some embodiments of the present invention.

FIG. 3 includes FIGS. 3A and 3B, where

Figure 1A:
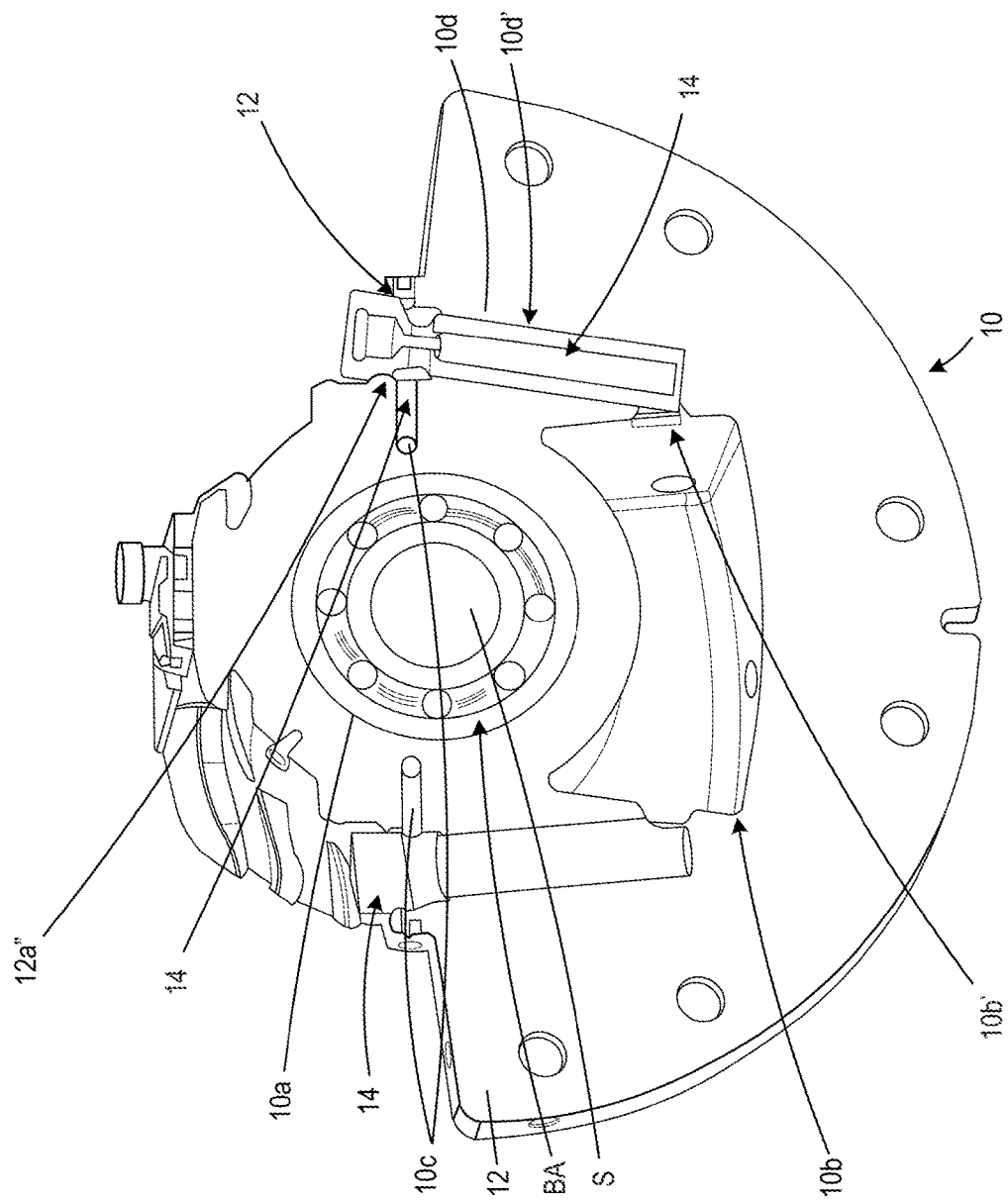
FIG. 1A is an illustration of a front view in cross-section (in a plane perpendicular to a longitudinal axis (front to back into the page)) of a shaft and bearing assembly combination) of a bearing housing assembly having one or more filter assemblies arranged in a bearing housing, according to some embodiments of the present invention.

Not every reference numeral is included in every Figure, e.g., so as to reduce clutter in the drawing as a whole.

DETAILED DESCRIPTION OF THE INVENTION

Figure 1B:
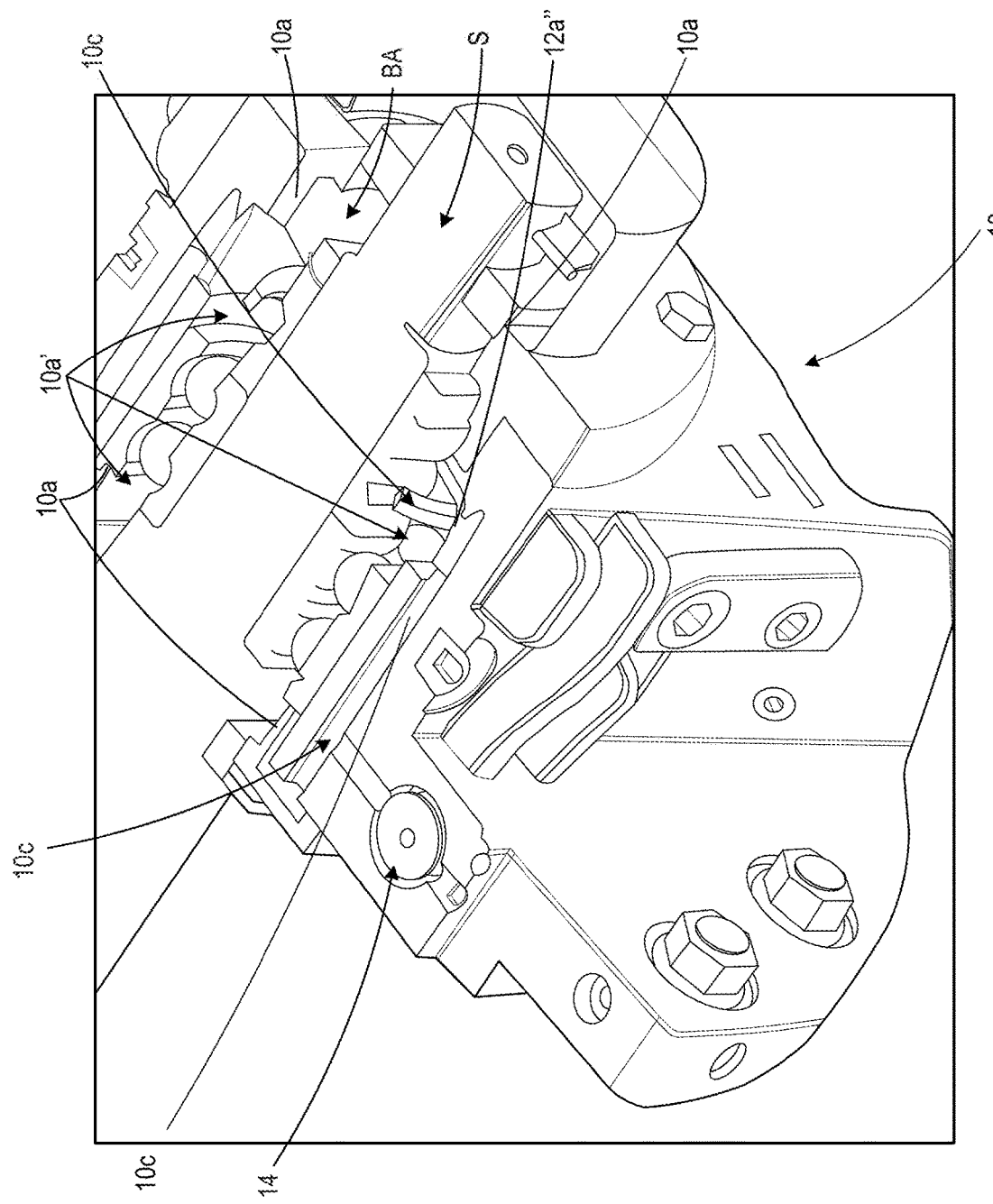
FIG. 1B is an illustration of a back perspective view in cross-section (in a plane parallel to the longitudinal axis (front to back into the page)) of a shaft and bearing assembly combination) of part of a bearing housing assembly having one or more filter assemblies arranged in a bearing housing, according to some embodiments of the present invention.

FIGS. 1A and 1B show a bearing housing assembly generally indicated as 10 having a bearing housing 12 and a filter assembly 14, according to some embodiments of the present invention. In FIG. 1A, reference arrow no. 1 indicates that sump oil flows through the filter assembly 14; reference arrow no. 2 indicates the sump oil enters the filter assembly 14; and reference arrow no. 3 indicates that filtered oil enters the oil sump from the filter assembly 14.

The bearing housing 10 may include a bearing housing wall portion 10a with a bearing assembly chamber 10a' configured or formed therein for receiving a combination of a bearing assembly generally indicated by BA and a shaft S to be rotated. The combination of the bearing assembly BA and shaft S is generally known in the art, e.g., and may include ball bearings, rings, inner and outer ball bearing sleeves, as one skilled in the art would appreciate. The bearing housing wall portion 10a with the bearing assembly chamber 10a' may be configured or formed to receive and contain the combination of the bearing assembly BA and shaft S, e.g., consistent with that disclosed herein.

The bearing housing 10 may include an oil sump generally indicated as 10b configured or formed therein for receiving and containing oil for lubricating the bearing assembly BA when the shaft S is rotated. By way of example, the oil sump 10b may configured in the lower part of the bearing housing 12, as shown in FIG. 1A.

The bearing housing 10 may include an oil path channel 10c configured or formed therein as an oil path for receiving dirty oil from the bearing assembly chamber 10a' for traveling down the oil path. (By way of example, the dirty oil may travel down the oil path via a gravity feed, or alternative by oil pressure caused by the combination of the bearing assembly BA and the rotating shaft S.)

The bearing housing 10 may include a filter assembly wall portion 10d configured to form a filter assembly cavity generally indicated as 10d' that is coupled fluidically between the oil sump 10b and the oil path channel 10c.

The filter assembly 14 may be configured to mount in the filter assembly cavity 10d', e.g., as shown in FIG. 1A, couple to the filter assembly wall portion 10d, receive the dirty oil traveling down the oil path, filter the dirty oil and provide filtered oil to the oil sump 10b via an oil sump port/channel 10b', so the filtered oil can be recirculated to lubricate the bearing assembly BA when the shaft S is rotated. By way of example, an oil pump (not shown) may be configured to pump oil from the oil sump 10b to the bearing assembly chamber 10a', e.g., via one or more oil recirculation channels, conduits or ports configured or formed in the bearing housing 12.

As shown in FIGS. 2A thru 2F, the filter assembly 14 may include a plug 14a having a filter assembly mounting portion 14a' configured to couple to the filter assembly wall portion 12a of the bearing housing 12. In particular, see FIG. 2B. By way of example, the filter assembly mounting portion 14a' and the filter assembly wall portion 12a may be coupled together using a threaded coupling arrangement, including where the filter assembly mounting portion 14a' has threads 14a'' that couple into corresponding threads 12a'' (FIG. 1A) of the filter assembly wall portion 12a of the bearing housing 12.

Figure 2A:
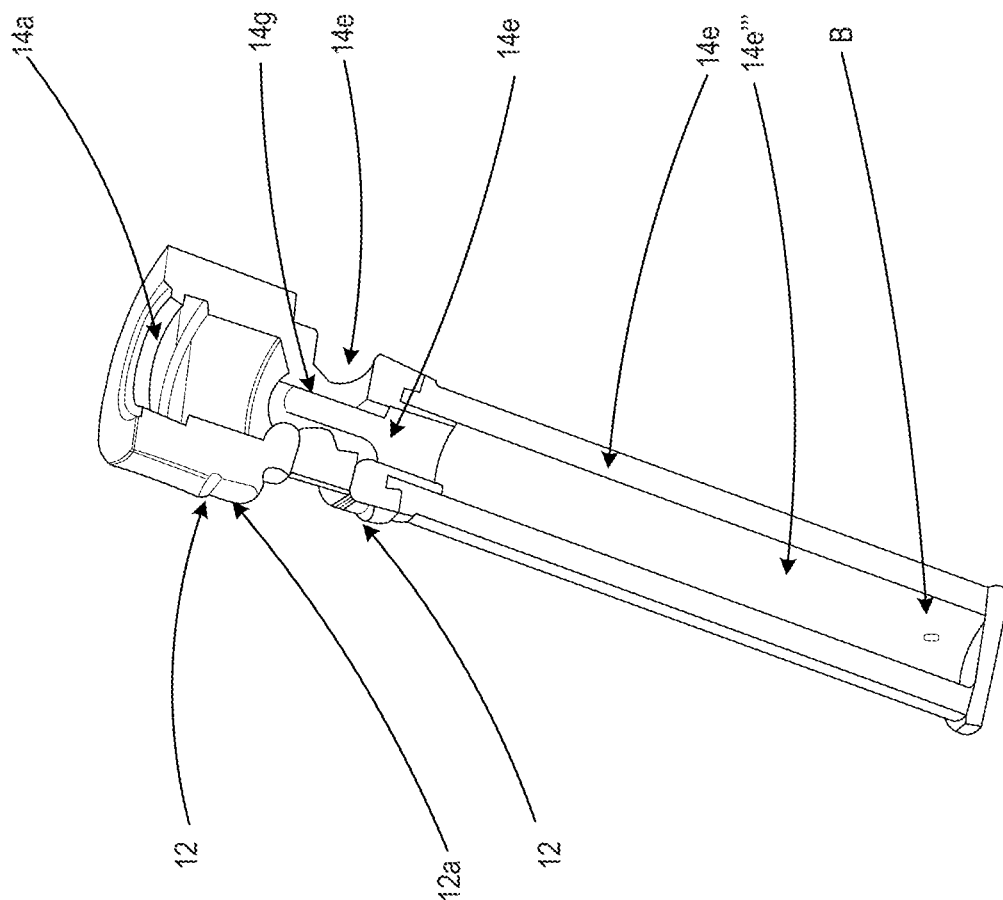
FIG. 2A is an illustration of a perspective view in cross-section (in a plane parallel to the longitudinal axis (top to bottom of the page)) of a filter assembly, according to some embodiments of the present invention.
Figure 2C:
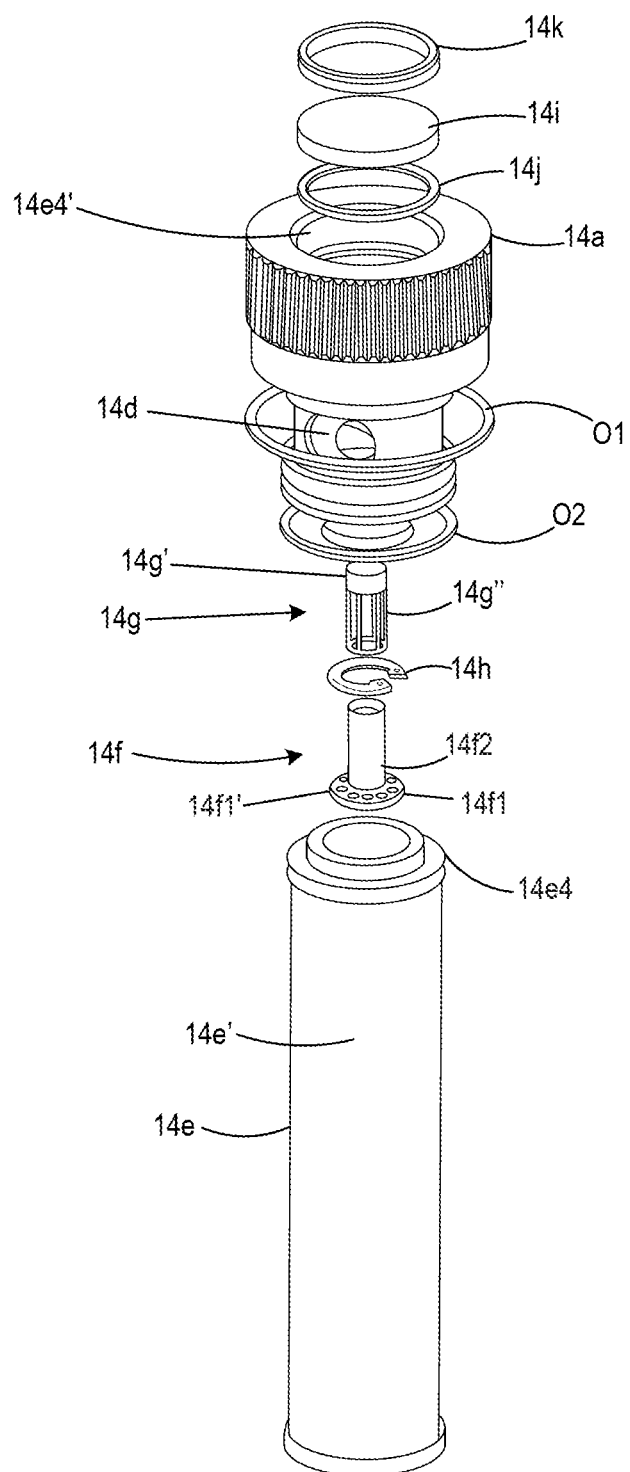
FIG. 2C is an exploded view of a filter assembly, according to some embodiments of the present invention.
Figure 2D:
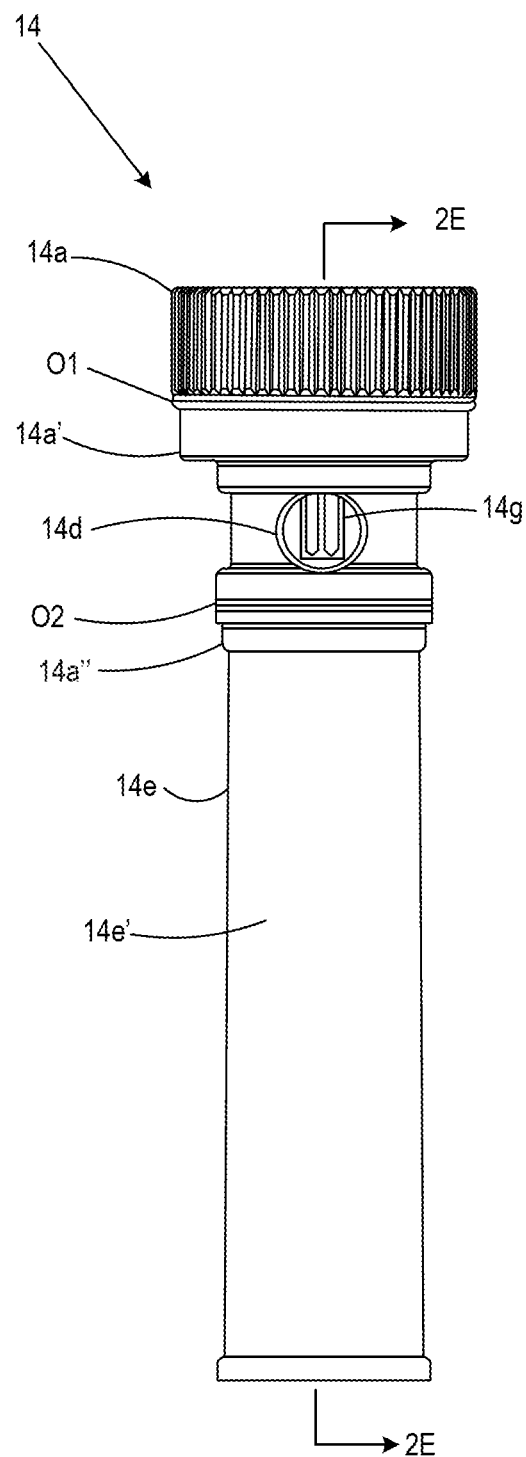
FIG. 2D is a side view of a filter assembly as assembled (in a plane parallel to the longitudinal axis (top to bottom of the page)), according to some embodiments of the present invention.
Figure 2E:
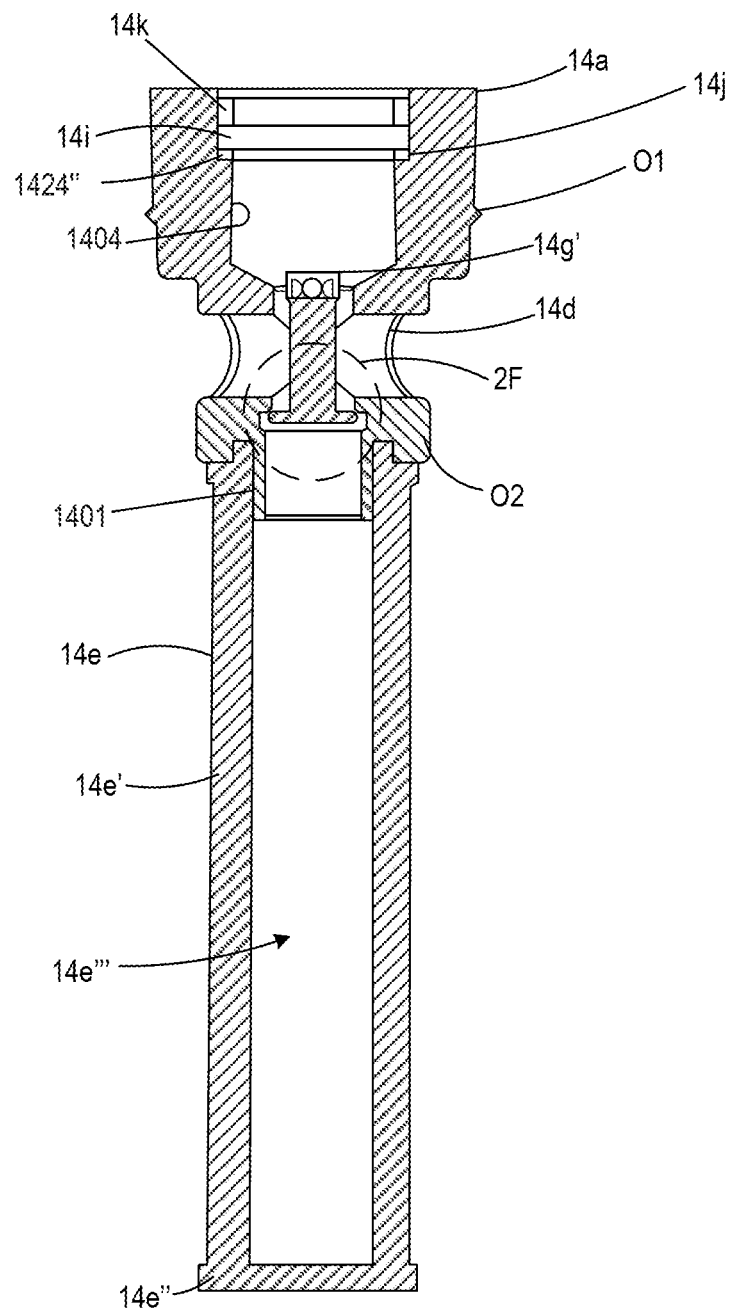
FIG. 2E is a cross-section view of the filter assembly in FIG. 2D along cross-section lines 2D-2D, according to some embodiments of the present invention.

As shown in FIG. 2A thru 2C, the plug 14a may include a plug housing 14c configured with a plug groove/hole 14d to receive and guide the dirty oil into the filter assembly 14, including where the plug groove/hole 14d is configured to pass completely through the plug housing 14c, as shown. See also FIG. 1A.

As shown in FIG. 2A thru 2C, the filter assembly 14 may include a filter or filter cartridge 14e coupled to a bottom end 14c1 of the plug housing 14c and configured to filter the dirty oil and provide filtered oil to the oil sump 10b, including where the filter cartridge 14e includes a pleated filtering material 14e' arranged in a cartridge mounting assembly 14e''.

The filter assembly 14 may include a filter indicator combination having a filter indicator stem 14f, a filter indicator 14g configured on the filter indicator stem 14f, and an internal retainer ring 14h configured to flex inwardly and outwardly for retaining the filter indicator stem 14f and the filter indicator 14g within the plug housing 14c, as described below. The filter indicator combination may be configured to pass the dirty oil received in the plug groove/hole 14d and provide the dirty oil to the filter or filter cartridge 14e.

Figure 2F:
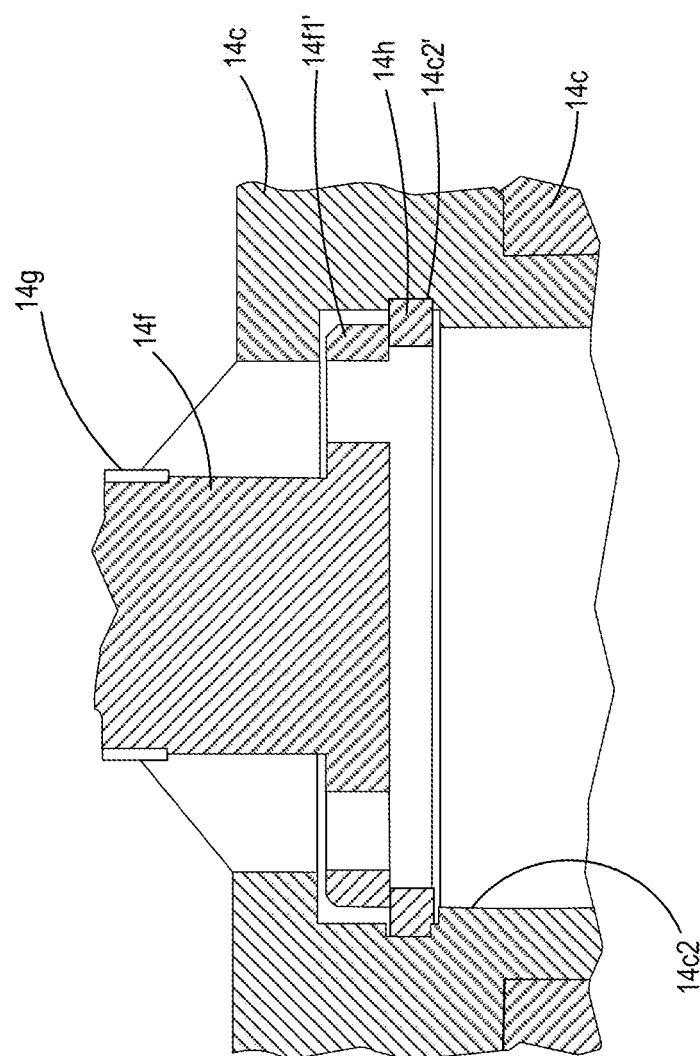
FIG. 2F is an exploded view of part of the filter assembly in FIG. 2E labeled as 2F, according to some embodiments of the present invention.

As best shown in FIG. 2F, the plug housing 14c may include a lower plug housing inner wall 14c2 having a lower annular channel 14c2' configured or formed therein. The filter indicator 14g may include a top portion 14g' and a bottom hollow portion 14g'', the top portion 14g' including, or being formed in part by, indicator paper or indicating the quality of the oil. The filter indicator stem 14f may include a base portion 14f1 and a stem portion 14f2, the base portion 14f1 may be configured with holes, openings, apertures or slots 14f1' formed therein to pass the dirty oil to the filter cartridge 14e, the stem portion 14f2 may be configured to receive the bottom hollow portion 14g'' of the filter indicator 14g. The internal retainer ring 14h may be configured to flex and fit into the lower annular channel 14c2' and retain the filter indicator combination in the lower plug housing inner wall 14c2.

The filter cartridge may be, or take the form of, a replaceable filter cartridge, including where the cartridge mounting assembly 14e'' has threads that couple to corresponding threads of the bottom end 14c1 of the plug housing 14c.

The filter cartridge 14e may be configured or formed with a filter cavity 14e'''; and the filter cartridge 14e may include moisture absorbing beads or crystals B that reside in the filter cavity 14e'''.

The filter assembly 14 may include a glass window 14i, an O-ring 14j and a glass retainer 14k configured to flex inwardly and outwardly. The plug housing 14c may include an upper plug housing inner wall 14c4 having an annular portion 14c4' and ledge 14c4'' configured or formed therein to receive the O-ring 14j and the glass retainer 14k by flexing and fitting the glass retainer 14k. The glass window 14i may be arranged and sealed between the O-ring 14j, the glass retainer 14k and the upper annular portion 14c4'.

As shown in FIG. 1A, the bearing housing wall portion 12a may include an oil ring channel or groove 12a''' configured or formed therein. The bearing housing assembly 10 may include an oil ring R arranged in the oil ring channel or groove 12a''' configured to fling, provide or guide oil into the oil path channel 12c.

Figure 3A:
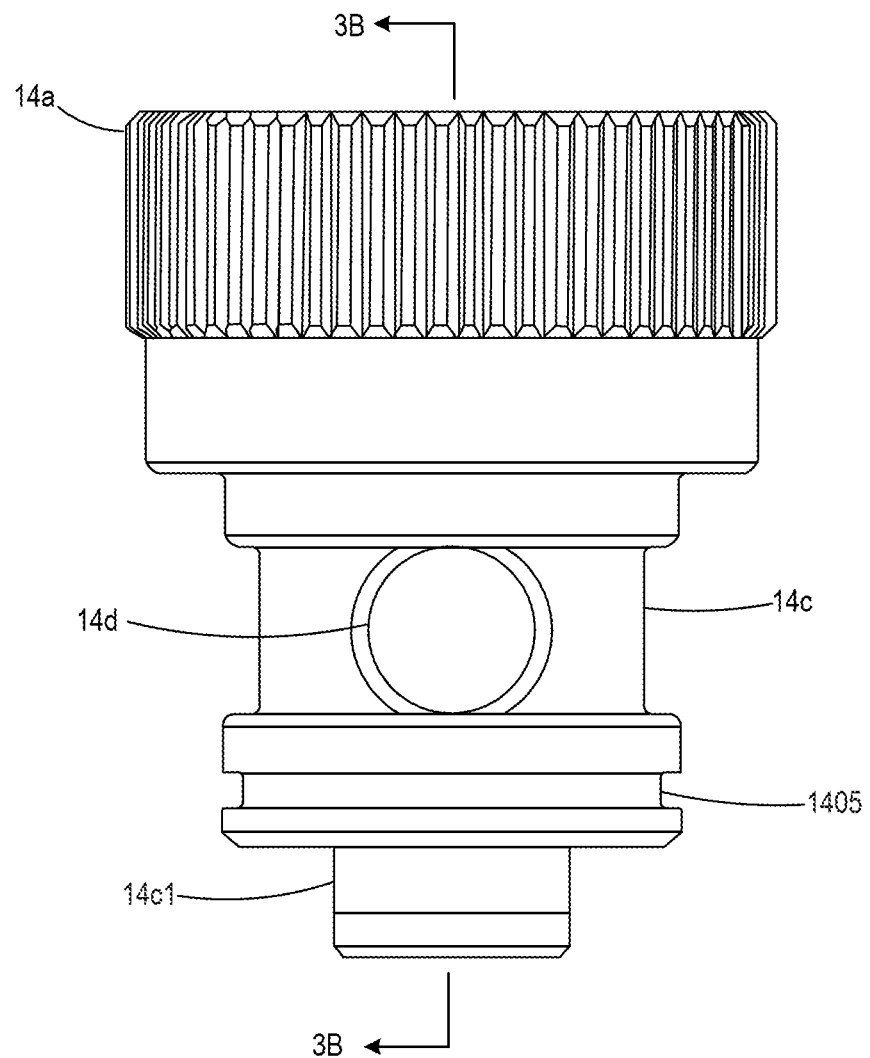
FIG. 3A shows a side view of a plug that forms part of the filter assembly, and where
Figure 3B:
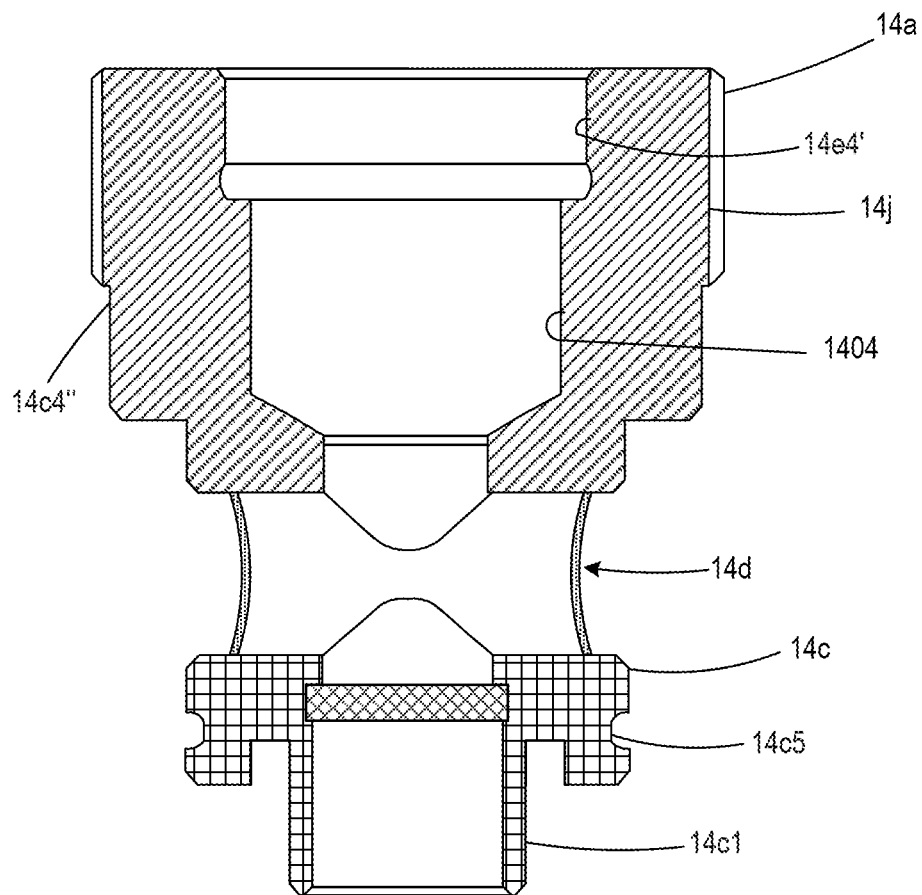
FIG. 3B shows a cross-sectional view of the plug in FIG. 3A along cross-section lines 3B-3B, according to some embodiments of the present invention.

The filter assembly 14 may include an upper O-ring O1 and a lower O-ring O2 for providing an upper and lower seal between the filter assembly 14 and the bearing housing wall portion 10a, as shown in FIGS. 1A and 2A thru 2E. By way of example, the lower O-ring O2 may be configured in an O-ring channel 14c5 formed in the plug housing 14c, as shown in FIG. 3B.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A housing assembly comprising:
    a housing comprising
        a first bearing housing wall portion that defines a chamber formed therein, wherein the chamber is configured to receive a combination of a bearing assembly and a shaft to be rotated,
        a filter assembly wall portion that defines a filter cavity formed therein, wherein the filter assembly wall portion is distinct from the first bearing housing wall portion such that the filter cavity is distinct from the chamber,
        a second bearing housing wall portion that defines a channel formed therein such that the channel is fluidically coupled between the chamber and the filter cavity effective to allow dirty oil to flow from the chamber to the filter cavity via the channel, and
        a third bearing housing wall portion that defines an oil sump formed therein, wherein the third bearing housing wall portion is distinct from the filter assembly wall portion such that the oil sump is distinct from the filter cavity, the oil sump is fluidically coupled to the chamber and the filter cavity, and the oil sump is configured to receive and contain filtered oil from the filter cavity effective to lubricate the bearing assembly when the shaft is rotated; and
    a filter assembly configured to mount in the filter cavity, receive the dirty oil from the channel, filter the dirty oil, and provide the filtered oil to the oil sump, such that the filtered oil is recirculated effective to lubricate the bearing assembly when the shaft is rotated.

2. The housing assembly according to claim 1, wherein the filter assembly comprises a plug with a filter assembly mounting portion configured to couple to the housing.

3. The housing assembly according to claim 2, wherein the filter assembly mounting portion and the housing are coupled together through a threaded coupling arrangement, and the filter assembly mounting portion includes threads configured to couple into corresponding threads of the housing.

4. The housing assembly according to claim 2, wherein the plug further comprises a plug housing configured with a plug groove/hole to receive and guide the dirty oil into the filter assembly, and the plug groove/hole is configured to pass completely through the plug housing.

5. The housing assembly according to claim 2, wherein the filter assembly comprises a filter or a filter cartridge configured to filter the dirty oil and provide the filtered oil to the oil sump, and the filter cartridge includes a pleated filtering material arranged in a cartridge mounting assembly.

6. The housing assembly according to claim 5, wherein the filter assembly comprises a filter indicator stem, a filter indicator configured on the filter indicator stem, and an internal retainer ring configured to flex inwardly and outwardly to retain the filter indicator stem and the filter indicator within the plug housing, the filter indicator and the filter indicator stem configured to provide the dirty oil received in the plug to a filter cartridge.

7. The housing assembly according to claim 2, wherein
    the plug further comprises a plug housing comprising a lower plug housing inner wall with a lower annular channel formed therein;
    the filter comprises a filter indicator comprising a top portion and a bottom hollow portion, the top portion including, or being formed in part by, an indicator paper to indicate a quality of the received dirty oil;
    the filter further comprises a filter indicator stem comprising a base portion and a stem portion, the base portion configured with holes formed therein to pass the dirty oil to the filter assembly, the stem portion configured to receive the bottom hollow portion of the filter indicator; and
    the filter further comprises internal retainer ring configured to flex and fit into the lower annular channel and retain the filter indicator combination in a lower plug housing inner wall.

8. The housing assembly according to claim 2, wherein the filter assembly comprises a replaceable filter cartridge and a cartridge mounting assembly that includes threads configured to couple to corresponding threads of a bottom end of a plug housing of the plug.

9. The housing assembly according to claim 1, wherein
    the filter assembly comprises a filter cartridge formed within the filter cavity; and
    the filter cartridge comprises moisture absorbing beads or crystals that reside in the filter cavity.

10. The bearing housing assembly according to claim 1, wherein
    the filter assembly comprises a glass window, an O-ring and a glass retainer configured to flex inwardly and outwardly, a plug housing that includes an upper plug housing inner wall with an upper annular portion configured to receive the O-ring and the glass retainer by flexing and fitting the glass retainer into the upper annular portion, and the glass window is arranged and sealed between the O-ring, the glass retainer and the upper annular portion.

11. The housing assembly according to claim 1, further comprising:
    a plurality of filter assemblies and a plurality of channels, each filter assembly configured to mount in a respective filter assembly cavity formed in the housing distinct from the oil sump, couple to a respective portion of the housing, receive respective dirty oil from respective channels formed in the housing, filter the received respective dirty oil, and provide respective filtered oil to the oil sump, such that the filtered oil is recirculated effective to lubricate the bearing assembly when the shaft is rotated.

12. The housing assembly according to claim 1, further comprising:
    a fourth bearing housing wall that includes an oil ring channel or groove formed therein; and
    the housing assembly includes an oil ring arranged in the oil ring channel or groove configured to fling, provide, or guide oil into the channel.

13. The housing assembly according to claim 1, wherein the filter assembly comprises an upper O-ring and a lower O-ring to provide an upper and lower seal between the filter assembly and the housing.

14. An pump assembly comprising:
a bearing assembly comprising:
a housing comprising
a first housing wall portion that defines a chamber formed therein, wherein the chamber is configured to receive a combination of a bearing assembly and a shaft,
a filter assembly wall portion that defines a filter cavity formed therein, wherein the filter cavity is formed distinctly from the chamber,
a second housing wall portion that defines a channel formed therein, wherein the channel is fluidically coupled between the chamber and the filter cavity effective to allow dirty oil to flow from the chamber to the filter cavity via the channel, and
a third housing wall portion that defines an oil sump formed therein, wherein the oil sump is formed distinctly from the filter cavity, the oil sump is fluidically coupled to the chamber and the filter cavity, and the oil sump is configured to receive and contain filtered oil from the filter cavity effective to lubricate the bearing assembly in the chamber when the shaft is rotated; and
a filter assembly mounted in the filter cavity, wherein the filter assembly is configured to:
filter the dirty oil received from the channel, and
provide the filtered oil to the oil sump to be recirculated to the chamber; and
a pump configured to pump a liquid from the bearing assembly.

15. The apparatus according to claim 14, wherein the at least one filter assembly comprises a mounting portion configured to be coupled to a portion of the housing through a threaded coupling arrangement.

16. The apparatus according to claim 14, wherein the at least one filter assembly further comprises at least one plug, each of the at least one plug comprising a plug housing configured with a plug groove/hole to receive and guide the dirty oil into the filter assembly.

17. The apparatus according to claim 14, wherein the at least one filter assembly further comprises at least one replaceable filter cartridge configured to filter the dirty oil and provide the filtered oil to the oil sump.

18. The apparatus according to claim 14, wherein the at least one filter assembly further comprises at least one filter cartridge configured to filter the dirty oil and provide the filtered oil to the oil sump, and each of the at least one filter cartridge includes a pleated filtering material arranged in a cartridge mounting assembly.

19. The apparatus according to claim 14, wherein the at least one filter assembly further comprises at least one filter cartridge configured to filter the dirty oil and provide the filtered oil to the oil sump, and each of the at least one filter cartridge comprises moisture absorbing beads or crystals that reside in the filter cavity.

\* \* \* \* \*